United States Patent
Burlingame

(10) Patent No.: US 6,646,222 B1
(45) Date of Patent: Nov. 11, 2003

(54) ELECTRON BEAM WELDING METHOD

(75) Inventor: Richard Ray Burlingame, Galway, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 58 days.

(21) Appl. No.: 10/073,995

(22) Filed: Feb. 14, 2002

(51) Int. Cl.[7] .............................................. B23K 15/00
(52) U.S. Cl. ................................................... 219/121.14
(58) Field of Search ....................... 219/121.12, 121.13, 219/121.14, 121.31, 121.32, 121.63, 121.64

(56) References Cited

U.S. PATENT DOCUMENTS 3,913,044 A * 10/1975 Albrecht et al.
4,496,635 A * 1/1985 Wang et al.
4,506,108 A * 3/1985 Kersch et al.
4,514,204 A * 4/1985 Bonney et al.

FOREIGN PATENT DOCUMENTS

JP 57017385 A * 1/1982
JP 08145257 A * 7/1996

* cited by examiner

Primary Examiner—Samuel M. Heinrich
(74) Attorney, Agent, or Firm—Richard A. Morgan; Paul A. Gottlieb

(57) ABSTRACT

A method of electron beam welding a copper work piece to a stainless steel work piece is disclosed. In a continuous path on the work pieces, an electron beam is first directed on the stainless steel work piece. The electron beam is then moved across the interface to the copper work piece. The electron beam is then moved on the copper work piece in a path essentially parallel to the interface between the two work pieces at a specified distance from the interface. The electron beam is then moved across the interface to the stainless steel work piece and then terminated. The result is a high quality weld at the interface. The method is used for making a high quality weld on an electrical conductor such as a busbar.

6 Claims, 2 Drawing Sheets

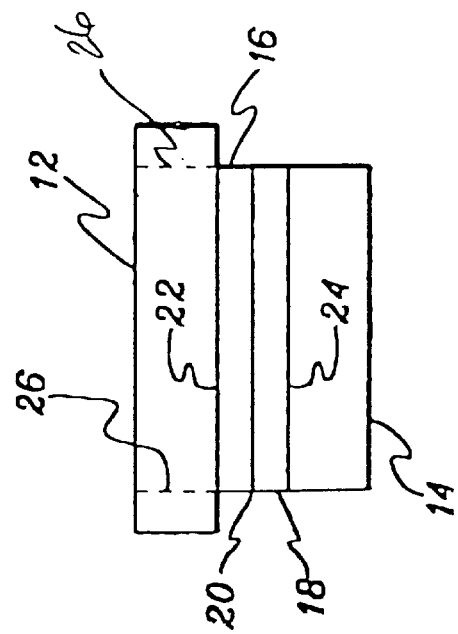
fig. 1C
(PRIOR ART)
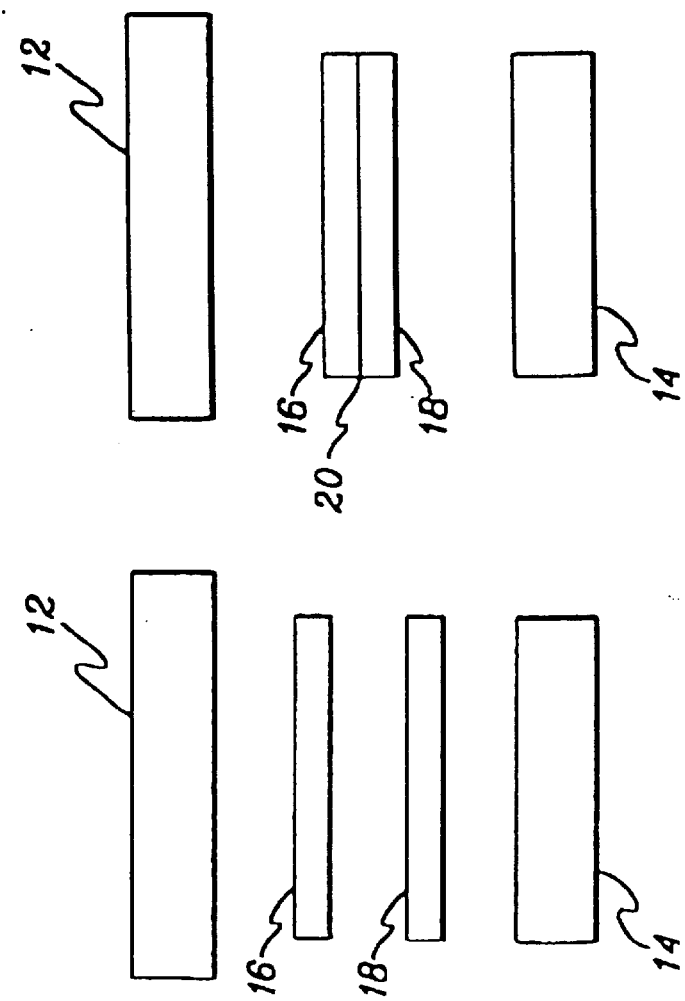
fig. 1B
(PRIOR ART)
fig. 1A
(PRIOR ART)

ELECTRON BEAM WELDING METHOD

STATEMENT OF GOVERNMENT INTEREST

The invention may be manufactured, used and licensed by or for the Government for Governmental purposes without the payment of any royalty thereon.

BACKGROUND OF THE INVENTION

1. Field of the Invention

The invention relates generally to the field of electron beam welding of dissimilar metals. More specifically, the invention relates to a method of electron beam welding of a cuprous metal to a ferrous metal. More particularly, the invention relates to welding copper to stainless steel.

2. Discussion of the Related Art

In an electron beam welding process a concentrated stream of high-energy electrons is directed to the abutting surfaces or interface of the work pieces to be welded. This high-energy electron bombardment causes rapid heating, forming a vapor hole surrounded by molten metal. The work piece is then moved away from the beam. The molten metal flows away from the hole and solidifies to form the weld.

This technique is highly satisfactory for welding relatively thin pieces of metal together. The process is also used to weld large structural members.

In general, an electron beam welding apparatus is provided with an electron gun and a driving table disposed in a vacuum chamber. The electron gun emits an electron beam which is directed on an interface between the two work pieces that melts and welds the metals at the abutment. Shortcomings have been found in the application of electron beam welding to dissimilar metals. Dissimilarity of metals can cause beam deflection resulting in unwelded spots, voids, cracks and other defects in the weld.

Difference in physical properties often hampers the welding of two dissimilar metals. Different melting points, different thermal conductivities, different thermal expansion coefficients, and different crystal structures can each cause problems. For example, when welding copper to stainless steel, excessive melting of copper and intermixing with steel in the weld zone can cause cracking, voids, and weld root porosity. These defects are detrimental to the integrity of the weld. Consequently, copper is not routinely joined to stainless steel by welding.

Explosion bonding is a method used for joining dissimilar metals. In explosion bonding the two metals are exposed to a series of shock waves that deform the abutting surfaces, physically interlocking the two metals. However, explosion bonding requires expensive, specialized equipment and inconvenient, controlled conditions.

It would be desirable to use electron beam welding (EBW) for joining dissimilar metals because the equipment is commonly available and the method is cost effective. In high-voltage, high-vacuum electron beam welding, the heat input to the weld interface can be precisely adjusted to allow control of the amount of metal intermixing. However, even with controlled heat input, the production of a mechanically sound joint between two dissimilar metals is difficult. Prior art electron beam welding methods have demonstrated limited success in applications where both mechanical integrity and electrical conductivity of the resulting work piece are required.

Inventor was motivated to find a method of welding dissimilar metals that overcomes the disadvantages of the prior art. Inventor searched for an electron beam welding method of joining copper and stainless steel to produce a high-quality, mechanically sound joint having high electrical conductivity.

SUMMARY OF THE INVENTION

The invention is a method of welding a copper work piece and a stainless steel work piece by an electron beam. According to the invention a copper work piece and a stainless steel work piece are placed in contact to form an interface therebetween. An electron beam is directed on the stainless steel work piece at a first point located a first distance from the interface. The electron beam is then moved on the work pieces in a direction that traverses the interface to a second point on the copper work piece a second distance from the interface. Then, the electron beam is moved on the copper work piece in a direction essentially parallel to the interface for a third distance to a third point, while maintaining the electron beam at the second distance from the interface. The electron beam is then moved on the work pieces in a direction that traverses the interface from the copper work piece to the stainless steel work piece to a fourth point. The electron beam is then terminated. A weld is thereby produced at the interface.

BRIEF DESCRIPTION OF THE DRAWINGS

FIGS. 1A, 1B, and 1C show a schematic representation of a method for joining two work pieces according to the prior art.

DETAILED DESCRIPTION OF THE INVENTION

Figure 2:
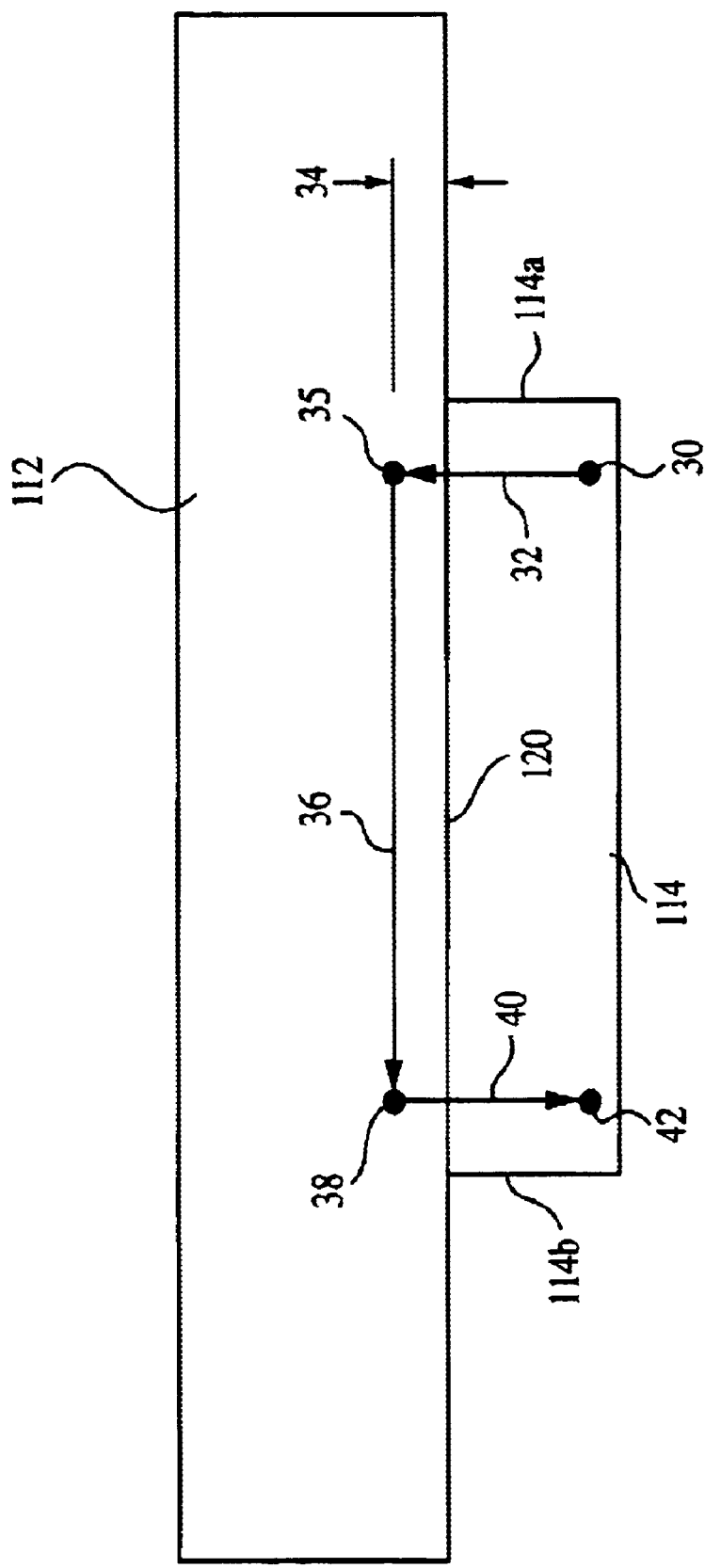
FIG. 2 shows a schematic representation of a method for joining two work pieces according to the invention.

FIGS. 1A, 1B, and 1C are a schematic representation of a method of joining two work pieces according to the prior art. A copper work piece 12 is to be joined to a stainless steel work piece 14.

Work pieces 12 and 14 are shown as rectangular plates. They may be any desirable thickness or shape. For example, work pieces 12 and 14 may be plates, bars, beams, cylinders, or any combination thereof.

FIG. 1A shows that work pieces 12 and 14 will be joined by means of copper intermediate work piece 16 and stainless steel intermediate work piece 18. Intermediate work piece 16 is usually the same material as work piece 12 and intermediate work piece 18 is usually the same material as work piece 14.

FIG. 1B shows intermediate work pieces 16 and 18 joined at explosion bond interface 20. Explosion bonding is the known method of joining work pieces of these two metals.

FIG. 1C shows intermediate work pieces 16 and 18 joined at explosion bond interface 20 to form a single intermediate work piece. Work piece 12 is shown joined to intermediate work piece 16 at interface 22. A conventional welding method is used, for example electron beam welding. Similarly, work piece 14 is joined to intermediate work piece 18 at interface 24 by a conventional welding method. The result is a single piece including work pieces 12, 14, 16, and 18. The single joined piece 12, 14, 16, 18 can be machined to a desired shape. For example, it can be machined to the shape illustrated by phantom lines 26.

Though the joining process shown in FIGS. 1A, 1B and 1C can effectively produce a single piece, this prior art process requires the welding of additional intermediate work pieces 16, 18, when only work pieces 12 and 14 are desired.

It is also cumbersome and expensive to bond intermediate work pieces 16 and 18 by explosion bonding. Explosion bonding is usually used only when the work pieces cannot be welded by a less expensive method. Special equipment is required for this procedure. It would be desirable to reduce the number of work pieces and eliminate the explosion bonding process when joining two work pieces such as work pieces 12 and 14.

It would be desirable to join the two metal pieces to produce a single piece having certain physical properties. That is, it would be desirable to join copper and stainless steel to produce a single piece having the electrical conductivity of copper and the corrosion resistance of stainless steel.

FIG. 2 shows two work pieces 112 and 114, that correspond with similar work pieces 12 and 14. Work pieces 112 and 114 are made of dissimilar metals. That is they are metals that typically cannot be joined by conventional welding methods. For example, work piece 112 may be composed of copper, such as oxygen-free hard copper. Work piece 114 may be composed of steel, such as stainless steel, particularly 300-series stainless steel, e.g. 304-type stainless steel.

Initially, work pieces 112 and 114 may be shaped by rough machining or fabricated oversize. The mating surfaces of each work piece is prepared by machining to a relatively flat, smooth finish in order to provide full contact between them. The work pieces are then cleaned to remove any machining fluids, grease, or other contaminants that could interfere with welding. The mating surfaces of the two work pieces are then put in contact to form interface 120, shown here as linear.

According to the invention, the work pieces 112 and 114 are joined along the interface 120 by electron beam welding. Unlike prior art methods in which the electron beam is directed at the interface 120, according to the invention, the electron beam is offset from the interface and is directed along the path on work pieces 112 and 114 shown in FIG. 2.

The electron beam from the electron beam welder is initially directed at a first point 30 on work piece 114. The distance of first point 30 from edge 114a, where the electron beam is initiated is not critical and may vary due to work piece geometry, such as thickness. Though the first point 30 may be located close to edge 114a, it is spaced from it by a distance well known in the art so that the heat of the beam does not melt or otherwise deform the edge 114a. The distance may be at least about 0.005 inches from it. It may be more, e.g. 0.200 inches. Likewise, the distance of first point 30 to the interface 120 is not critical. It is selected to initiate the weld on the stainless steel work piece. The distance of first point 30 to the interface 120 is at least 0.005 inches from it, typically 0.200 inches from interface 120.

The electron beam is then moved or traversed in a direction toward the interface 120 between the two work pieces as shown by arrow 32. Rate of traverse is between about 1 inch per minute to about 50 inches per minute, preferably between about 5 inches per minute and about 20 inches per minute, most preferably between about 8 inches per minute and 12 inches per minute. Though arrow 32 is directed perpendicular to linear interface 120, the direction of arrow 32 may be non-perpendicular to interface 120 and still effect the desired weld as long as the beam remains continuously in contact with the work pieces. After traversing the interface 120, the electron beam is moved beyond the interface 120 to second point 35 on work piece 112, at a distance 34 from the interface 120. Distance 34 has been found to be critical. This distance 34 is at least about 0.005 inches to about 0.1 inches. By way of example, for one-half inch thick work pieces, the distance 34 is typically between about 0.005 inches and 0.020 inches, preferably between about 0.010 inches to about 0.015 inches.

Then, according to the invention, the electron beam is moved along work piece 112 in a direction essentially parallel to the interface 120 while maintaining the distance 34 as shown by arrow 36. The rate of movement of the beam along line 36 is between about 1 inches per minute to about 50 inches per minute, but is preferably between about 5 inches per minute to about 20 inches per minute, and most preferably about 8 inches per minute and 12 inches per minute. Though the path 36 of the beam may extend the length of the interface 120, the movement of the beam in a path essentially parallel to interface 120 is terminated at a third point 38 before the end of interface 120.

The end of interface 120 is defined by edge 114b of work piece 114. The distance of both third point 38 and fourth point 42 from edge 114b is selected by the same criteria as the distance of first point 30 from edge 114a. Third point 38 and fourth point 42 are spaced from edge 114b by an amount so that the heat of the beam does not melt or otherwise deform edge 114b. The distance is well known in the art and may be at least about 0.005 inches from it, typically 0.200 inches.

The distance at which the parallel movement of the beam is terminated may vary due to work piece geometry such as thickness. The third distance between second point 35 and third point 38 is the length of the weld. Only the length of the interface 120 between the two work pieces limits the length of the weld.

Finally, the electron beam is moved to traverse the interface 120 as shown by arrow 40 and terminates at fourth point 42 on the surface of work piece 114. The distance of fourth point 42 from the interface 120 is not critical. It is selected to terminate the weld on the stainless steel work piece. The distance of fourth point 42 to interface 120 is at least about 0.005 inches, typically about 0.200 inches. The rate of movement of the electron beam along arrow 40 is about 1 inch per minute to 50 inches per minute, preferably about 5 inches per minute to 20 inches per minute, most preferably about 8 inches per minute to 12 inches per minute.

During the making of the weld, the electron beam is in continuous contact with a work piece or the interface from first point 30 to fourth point 42. At fourth point 42 the electron beam is terminated. The result is a continuous weld between work pieces 112 and 114. The thickness of the weld depends upon the thickness of the interface 120 between the work pieces. The thickness of the weld is typically between about 0.010 inches and about 5.0 inches. Depending upon the thickness of the abutting work pieces at interface 120 and the energy of the electron beam, the weld provided at the interface 120 may be a full or partial penetration weld, though a full penetration weld is desired to provide maximum mechanical strength and electrical and thermal conductivity.

Though a butt weld of two plates is shown in FIG. 2, the invention is also applicable to other type weld joints such as lap welds, corner welds, edge welds, tee welds, including circumferential welds and longitudinal welds for cylindrical work pieces.

Electron beam sources are commercially available at powers, voltages and currents that are useful for practicing the invention. For example, the electron beam may be provided by a source having between about 5 kilowatts and about 60 kilowatts of power, a voltage ranging from about 30 to 175 kilovolts, and a current ranging from about 1 to 500 milliamps. A preferred electron beam source is a high-voltage electron beam welding machine providing about 25 kilowatts of power i.e. about 175 kilovolts at about 140 milliamps. It will be apparent to those of skill in the art that the electron beam welding method described herein is particularly adaptable to a computer numerically controlled (CNC) electron beam welding process.

Though many beam deflection patterns may be used for the electron beam of the invention, a lazy eight beam deflection pattern has been found to be particularly effective. Inventor found a lazy eight electron-beam deflection pattern together with a counterclockwise path and a traversal rate of about 10 inches per minute, as shown in FIG. 2, resulted in a weld zone that was predominantly copper. The amount of intermixing of stainless steel with the copper was reduced. The occurrence of cracking in the welded joint was therefore reduced or eliminated. It was also found that any weld defects, were located primarily in the vicinity of the starting point, first point 30 and the ending point, fourth point 42. Some weld undercutting was found on the top surface of the copper at the weld interface 120. However, by starting with oversized work pieces 112 and 114, these defects were removed with the final machining.

Additional work pieces may be welded to work pieces 112 and 114 to form a final welded product. This is accomplished by conventional welding when the metals are the same.

The invention is useful for joining copper to stainless steel, particularly 300-series stainless steel. Examples of 300-series stainless steel are stainless steel 304, stainless steel 308, stainless steel 316 and stainless steel 316L. In addition to joining copper to stainless steel, the invention may also be used to join metals such as: copper to steel, copper alloys to steel alloys, copper alloys to stainless steel and the like.

The welds produced by the invention are typically narrow, deep penetrating welds with small heat-affected zones, and minimal amounts of shrinkage and distortion. The mechanical strength of the welds produced by the invention can exceed the strength of the parent work pieces and the thermal and electrical properties of welds produced by the invention can exceed the thermal and electrical properties of the welds produced by explosion bonding. The invention is particularly useful for joining dissimilar metals in electronic devices where the mechanical strength of one metal is combined with electrical properties of another metal, such as in an electrical busbar.

The thermal properties of welds closely parallel the electrical properties of welds. The invention provides welds with desirable mechanical, thermal, and electrical properties.

This invention is shown by way of Example.

EXAMPLE 1

Test specimens of a copper/stainless steel weldment fabricated according to the invention were made and evaluated for mechanical strength and thermal and electrical conductivity. One set of test specimens was destructively evaluated for mechanical strength and the copper/stainless steel weld produced according to the invention was found to have mechanical strength superior to the parent copper piece.

A copper/stainless steel weld fabricated according to the invention was found to have a conductance of 98.75% of theoretical. An explosion-bonded joint fabricated from the same materials had a conductance of 73.8% of theoretical.

EXAMPLE 2

A half-inch thick oxygen free hard copper busbar was welded directly to a half inch thick 304 stainless steel transition according to the invention. Welding was by means of a high voltage, i.e. 25 kilowatt (175 kilovolts at 140 milliamps), high vacuum, electron beam welder. The computer numerically controlled (CNC) welder was set for a lazy eight beam deflection pattern, and a counterclockwise beam path. Beam traversal rate was set at 10 inches per minute. The beam path was parallel to the interface and offset 0.010 to 0.015 inches on the copper side of the interface.

The electron beam was kept at least 0.200 inches from any edge of the work pieces to prevent heat distortion of the edge. Welding was started on the stainless steel side of the interface. The computer controlled electron beam traversed the interface and then followed a path parallel offset from the interface on the copper side. At 0.200 inches from the end of the joint, the beam direction was changed to traverse the interface and finish on the stainless steel side of the interface. The electron beam was shut off. The result was a high quality, mechanically sound and electrically conductive weld.

Example 2 is the Best Mode for carrying out the invention and for use of welds of the invention contemplated by Inventor.

The foregoing discussion discloses and describes embodiments of the present invention by way of example. One skilled in the art will readily recognize from this discussion and from the accompanying drawings and claims, that various changes, modifications and variations can be made therein without departing from the spirit and scope of the invention as defined in the following claims.

What is claimed is:

1. A method of welding a copper work piece to a stainless steel work piece by means of an electron beam, comprising:
   contacting the copper work piece and the stainless steel work piece to form an interface therebetween;
   directing the electron beam onto the stainless steel work piece at a first point a first distance from the interface;
   then moving the electron beam in a direction that traverses the interface from the stainless steel work piece to a second point on the copper work piece, the second point a second distance from the interface;
   then moving the electron beam on the copper work piece in a direction essentially parallel to the interface a third distance while maintaining the electron beam at essentially the second distance from the interface; and
   then moving the electron beam in a direction that traverses the interface from the copper work piece to a fourth point on the stainless steel work piece;
   thereby producing a weld at the interface between the copper work piece and the stainless steel work piece.

2. The method of claim 1 wherein the second distance is at least about 0.005 inches.

3. The method of claim 1 wherein the second distance is about 0.005 to 0.100 inches.

4. A method of welding a copper work piece to a steel work piece by means of an electron beam, comprising:
   contacting the copper work piece and the steel work piece to form an interface therebetween;
   directing the electron beam onto the steel work piece at a first point a first distance from the interface;
   then moving the electron beam in a direction that traverses the interface from the steel work piece to a second point on the copper work piece, the second point a second distance from the interface;

then moving the electron beam on the copper work piece in a direction essentially parallel to the interface a third distance while maintaining the electron beam at essentially the second distance from the interface; and then moving the electron beam in a direction that traverses the interface from the copper work piece to a fourth point on the steel work piece;

thereby producing a weld at the interface between the copper work piece and the steel work piece.

5. The method of claim 4 wherein the second distance is at least about 0.005 inches.

6. The method of claim 4 wherein the second distance is about 0.005 to 0.100 inches.

* * * * *